cretating pressures of about 20,000 to 35,000 p.s.i. the maximum exit temperature might be from 560° F. to 520° F. respectively. However, as mentioned before, this can vary.

One example of the processes discussed above is disclosed in British Patent Specification 1,160,659 which is hereby incorporated by reference into this application. It is to be understood however that for the purpose of the present application, the particular manner or sequence of introducing monomer feed and initiators to the reactor is not important and many other variations or modifications thereof not covered by said patent can also be used.

One serious drawback of the aforementioned processes is the gradual buildup of polymeric material on the inside of the tubular reactor with attendant decrease in the overall heat transfer from the reactor to the cooling medium. This is evident from the gradual increase in reactor temperature with time especially at the reactor outlet even with the use of a rapid pressure pulse of the reactor during polymerization. When the maximum allowable reactor outlet temperature has been reached, the reactor melt index may be markedly increased above the product target until the reactor is clean, or the reaction may be terminated maintaining pressure to pressure pulse the reactor clean, or the unit may be completely shut down for solvent washing. Each of the above methods of cleaning have limitations and economic disadvantages. The "down time" required for one such clean up operation, usually amounts to many hours and typically the operating efficiencies range between 80–85 percent. Since commercial installations are generally quite large with hourly polymer production rates of many thousands of pounds, it is evident that even a few percent improvements in the efficiency will represent considerable savings to the producer.

In accordance with the foregoing it is an object of the present invention to provide a process for the production of ethylene polymers with impoved efficiency. Another object is to decrease fouling of tubular reactor employed for the high pressure production of ethylene polymers.

Other objects will be apparent from the specification and appendant claims.

In accordance with the present invention the foregoing objects are achieved in a high pressure ethylene polymerization process by introducing small quantities of hydrogen into the tubular reactor amounting to between about 10 and about 150 p.p.m. by volume of the fresh monomer charge to the reactor. Conveniently, the hydrogen stream is introduced to the reaction system with the fresh monomer charge of charges, however, it is also within the scope of the invention to introduce the hydrogen stream into the monomer recycle stream. In order to provide for safe operation without problems of hydrogen embrittlement when using relatively ordinary materials of construction for the high pressure reactors, it is preferred that the hydrogen concentration not exceed 50 p.p.m. by volume based on the fresh monomer charged. The small concentration of hydrogen in the reactor is insufficient to cause any noticeable changes in product quality. Reference is had to U.S. Pat. No. 2,387,755 which discloses that a concentration of at least 0.1 wt. percent (1000 p.p.m. by weight which is equal to about 14,000 p.p.m. by volume) of hydrogen is needed to modify polyethylene product properties.

It is not known how the hydrogen reduces the formation of solid polymers fouling the inner surfaces of the reactor tube. One possibility is that the hydrogen combines with some reactive precursor present in the ethylene feed as an impurity. Commercially available ethylene usually contains a few tenths of a percent on a molar basis of a wide variety of impurities including carbon monoxide, acetylenes, diolefins etc. Another possible explanation might be that the hydrogen retards the long chain branching reaction and reduces the tendency to form ultra-high molecular weight polyethylene. Whatever the mechanism, however, the presence of hydrogen in the reactor in accordance with the present invention dramatically increases the operating efficiency of the process, i.e. typical improvements therein amounting to 10% or more are encountered.

The inside diameter of the reactor tube generally ranges between ½" to 2" and the L/D ratio is usually at least 2000 to 1 and up to 2,000,000 to 1, or higher. The reaction pressures range from at least 15,000 p.s.i. up to about 100,000 p.s.i. and the temperatures range from about 250° F. to 650° F. The pressures in the high pressure separator range from about 1500 to 7500 p.s.i.

The initiators for the polymerization reaction include oxygen and the peroxides such as hydrogen peroxide, 2,4-dichlorobenzoyl peroxide, caproyl peroxide, lauroyl peroxide, t-butyl peroxyisobutylrate, benzoyl peroxide, di-t-butyl peroxide, p-chlorobenzoyl peroxide, diisopropyl peroxydicarbonate, acetyl peroxide, decanoyl peroxide, t-butyl peroxypivalate, t-butyl peroxybenzoate, cumyl peroxide, diethyl dioxide, t-butyl hydroperoxide, methyl ethyl ketone peroxide, di-t-butyl diperoxyphthalate, hydroxyheptyl peroxide, cyclohexanone peroxide, p-menthane hydroperoxide, pinane hydroperoxide, cumene hydroperoxide, t-butyl peroxide, 2,5-dimethyl hexane-2,5 dihydroperoxide, t-butyl peroctoate, t-butyl peracetate, 1,1,3,3-tetramethyl butyl hydroperoxide and the like, or mixtures thereof. The total concentration of initiators varies according to the type and amount introduced. Thus, for polymerization reactions carried out at pressures of about 15,000 p.s.i. as high as 500 parts per million on an ethylene molar basis can be used, while for higher pressures such as 40,000 to 60,000 p.s.i., the concentration can be as low as 1 to 5 parts per million.

In addition to the ethylene feed, a comonomer in amounts ranging from 0.1 to 20 mole percent of the ethylene feed may be employed. Illustrative examples of such comonomers include alpha-olefins such as propylene, butenes and pentenes; and vinyl acetate. Known modifiers can also be introduced into the polymerization system with the feed in amounts ranging from 0.01 to 5 mole percent of the ethylene feed. The modifiers include, for example, hexane or butane. The addition of a comonomer and/or modifiers permits one to vary the physical properties of the polyethylene products as is well known in the art.

The following examples illustrate the process and the advantages derived therefrom.

Large scale polymerization of ethylene (containing about 1 part per million of hydrogen) to produce film grade polymer was carried out in a battery of 6 water jacketed tubular reactors each having an L/D ratio of 13,400 and having provisions for feeding fresh and recycle ethylene, propylene modifier and initiators to the inlet of the tubular reactor whereby a first reaction zone was established having a temperature peak approximately 1850 diameters from the inlet. Additional ethylene and initiators were introduced downstream from said temperature peak at points located 6700 diameters and 7070 diameters respectively from the inlet, and a second reaction zone having a second temperature peak approximately 9000 diameters from the inlet was established. The amounts of initiators fed to the reactor were adjusted to give the desired peak temperatures. The effluent from the reactor was passed to a high pressure separator for separation of unreacted ethylene from the polymer. The separated gas was recycled to the front end inlet of the tubular reactor after compression, and the polymer was subsequently passed to a low pressure separator where additional unreacted monomer was removed and withdrawn from the reaction system. Indications of progressive fouling of the reactors were given by the gradual rise in reactor temperatures at the location of the second feed introduction and at the outlet of each of the tubular reactors, where the temperature rise was even more pronounced. When the maximum allowable outlet temperature of a reactor had been reached, this reactor was shut down for cleaning. This happened 6 times during a 7 day operation of the 6 reactors. The nominal operating conditions are shown in Table I and the pertinent product quality analyses are listed in Table II.

TABLE I

| | |
|---|---|
| Ethylene Feed Flow Rates in Percent Fresh Feed: | |
| Inlet | 10.7 |
| At 6700 Diam. | 17.9 |
| Recycle | 71.4 |
| Ethylene Space Velocity-lbs./hr./cu. ft. reactor volume | 4600 |
| Initiator Mole Ratio [1]: | |
| Inlet | 4/2/1/0.4/0.2 |
| At 7070 Diam. | 0/2/1/0.4/0.2 |
| Modifier Concentration - mole percent (Basis Total Ethylene Feed) | 0.3 |
| Pressure-p.s.i. | 34,000 |
| Reactor Temperatures-° F.: | |
| Inlet | 340 |
| First Peak | 620 |
| At 6700 Diam. (Beginning-End) | 390–420 |
| Second Peak | 620 |
| Outlet (Beginning-End) | 435–545 |
| Polyethylene Production Rate—Percent of Feed Rate | 20.4 |

[1] The mole ratio is for the system decanoyl peroxide/benzoyl peroxide/t-butyl peracetate/di-t-butyl peroxide/paramenthane hydroperoxide.

TABLE II

| | |
|---|---|
| Melt Index gm./10 min. | 2.2 |
| Density | 0.919 |
| Dart Impact value-gm./mil of film (ASTM D–1709) | 110 |

The same reactors were operated under identical conditions except that hydrogen had been added to the fresh ethylene in amounts of 20 part per million by volume. The hydrogen concentration in the recycle stream was analyzed to about 31 p.p.m. by volume. The reactors were operated for 8 days with only 1 shut down necessary for cleaning. Analyses of the polymer product showed no change from that obtained in operations without hydrogen addition.

What is claimed is:

1. In a process for the continuous polymerization of monomer comprising ethylene in the presence of a free radical initiator employing a reaction system comprising an indirectly cooled tubular reactor wherein monomer is introduced at least to the inlet of the reactor and fresh monomer make-up gas is provided to the reaction system, the polymer product is separated from unreacted monomer and unreacted monomer is recycled to the reactor, the improvement which comprises continuously adding hydrogen to the reactor in amounts corresponding to between 10 and 150 p.p.m. by volume of the fresh monomer make-up gas to the reaction system.

2. The process of claim 1 wherein the hydrogen is added with the fresh monomer make-up gas.

3. The process of claim 1 wherein the hydrogen is added with the recycle monomer stream.

4. The process of claim 1 wherein additional monomer is introduced at a point along the length of the reactor and a portion of the hydrogen is introduced with said additional monomer.

5. The process of claim 1 wherein the hydrogen is added in amounts corresponding to between 10 and 50 p.p.m. by volume of the fresh monomer make-up gas to the reaction system.

6. The process of claim 1 wherein the monomer consists of essentially ethylene.

7. The process of claim 1 wherein the monomer is a mixture of ethylene and at least another monomer copolymerizable with ethylene.

8. The process of claim 7 wherein at least a portion of the hydrogen is introduced with fresh make-up stream of the monomer copolymerizable with ethylene.

References Cited

UNITED STATES PATENTS

| | | | |
|---|---|---|---|
| 2,387,755 | 10/1945 | Hanford | 260—94.9 R |
| 2,999,856 | 9/1961 | Bestian et al. | 260—94.9 R |
| 3,334,081 | 8/1967 | Madgwick et al. | 260—94.9 R |
| 3,399,185 | 8/1968 | Schappert | 260—94.9 R |
| 3,546,189 | 12/1970 | Rätzsch et al | 260—94.9 R |
| 3,551,397 | 12/1970 | Rätzsch et al. | 260—94.9 R |
| 3,557,074 | 1/1971 | Buechner et al. | 260—94.9 R |
| 3,725,378 | 4/1973 | Chamberlin | 260—94.9 R |

FOREIGN PATENTS

| | | | |
|---|---|---|---|
| 1,160,659 | 8/1969 | Great Britain | 260—94.9 R |

JOSEPH L. SCHOFER, Primary Examiner

A.H. HOLLER Assistant Examiner

U.S. Cl. X.R.

260—87.3, 88.2B, 94.9P